(12) United States Patent
Russell et al.

(10) Patent No.: US 7,722,128 B2
(45) Date of Patent: May 25, 2010

(54) RETENTION SYSTEM FOR PLASTIC WHEEL TRIM

(75) Inventors: Martin Russell, Smyrna, TN (US);
Augusto Mayer-Pujadas, Bloomfield, MI (US)

(73) Assignee: Zanini Auto Grup, SA, Barcelona (ES)

( * ) Notice: Subject to any disclaimer, the term of this patent is extended or adjusted under 35 U.S.C. 154(b) by 380 days.

(21) Appl. No.: 11/754,699

(22) Filed: May 29, 2007

(65) Prior Publication Data

US 2007/0278847 A1 Dec. 6, 2007

Related U.S. Application Data

(60) Provisional application No. 60/803,467, filed on May 30, 2006.

(51) Int. Cl.
*B60B 7/14* (2006.01)

(52) U.S. Cl. .................................. 301/37.373

(58) Field of Classification Search ............ 301/37.101, 301/37.102, 37.31–37.34, 37.373, 37.42
See application file for complete search history.

(56) References Cited

U.S. PATENT DOCUMENTS

| 4,382,635 | A | 5/1983 | Brown |
| 4,458,952 | A | 7/1984 | Foster |
| 4,547,021 | A | 10/1985 | Abbate Daga |
| 5,163,739 | A | 11/1992 | Stanlake |
| 6,022,081 | A | 2/2000 | Hauler |
| 6,402,254 | B1 | 6/2002 | Eikoff |
| 6,682,151 | B1 | 1/2004 | Van Houten |
| 6,953,226 | B2 | 10/2005 | Bruce |
| 6,986,553 | B2 | 1/2006 | Jensen |
| 7,387,346 | B2 * | 6/2008 | Sabanes et al. ........ 301/37.373 |

FOREIGN PATENT DOCUMENTS

| WO | WO 2004-091935 A1 | 10/2004 | |
| WO | WO2005/080097 | * 9/2005 | ............ 301/37.373 |

* cited by examiner

*Primary Examiner*—Jason R Bellinger
(74) *Attorney, Agent, or Firm*—Seth Natter; Natter & Natter

(57) ABSTRACT

A lug nut engaging retention for plastic wheel trim includes a plurality of tubular sockets which project axially from the inner face of the wheel trim. Each socket comprises three concentric arcuate lug nut engaging panels. Two of the panels include lips that snap over a peripheral flange of a lug nut, while the third panel is fixed relative to the wheel trim and serves as a centering guide. A circumscribing ring engages the periphery of the panels adjacent their apical ends to reinforce the radially inwardly directed bias of the lipped panels. Three legs are positioned about the socket center at a radius greater than that of the panels. Each leg includes a pair of axially spaced abutments which engage the ring to limit axial movement of the ring relative to the panels.

20 Claims, 3 Drawing Sheets

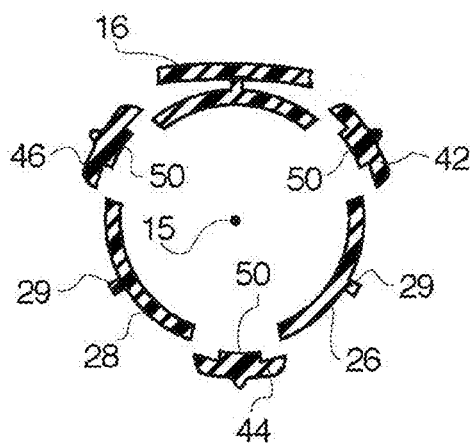
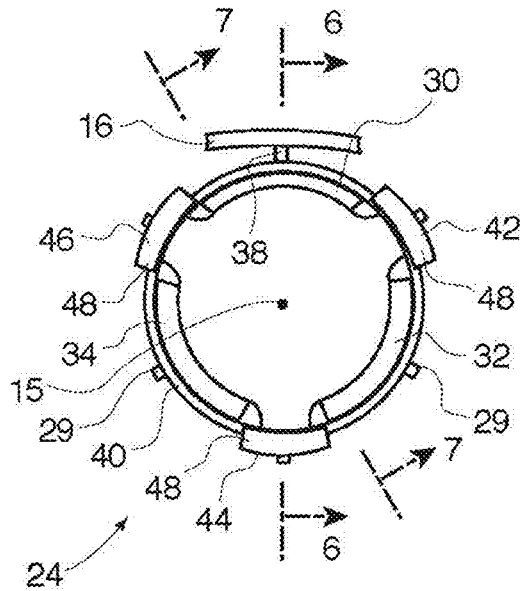
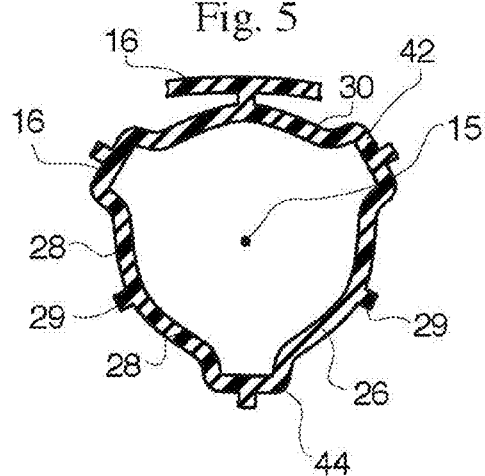
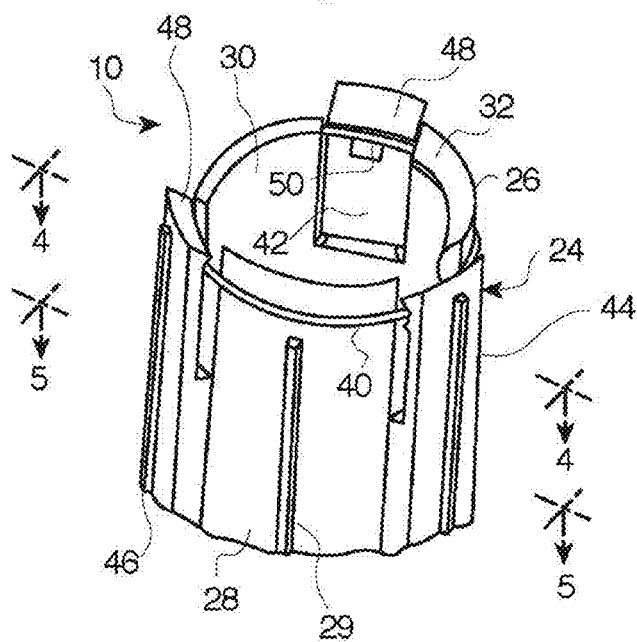

RETENTION SYSTEM FOR PLASTIC WHEEL TRIM

RELATED APPLICATIONS

This application claims the benefit of provisional Application No. 60/803,467 filed May 30, 2006, the entirety of which is incorporated herein by reference.

BACKGROUND OF THE INVENTION

1. Field of the Invention

This invention relates generally to wheel trim and more particularly to a lug nut engaging retention system which resists degradation at elevated wheel temperatures.

2. Antecedents of the Invention

Plastic wheel trim have been employed for several years. Among the attributes of plastic wheel trim are resistance to water, road salt and other environmental factors, which effected corrosion in metal wheel trim.

A primary advantage of plastic wheel trim was that it was light in weight and thus did not significantly contribute to total vehicle weight. As such, the employment of plastic wheel trim was one of several factors contributing to increased vehicle mileage efficiency.

Further, plastic wheel trim was moldable into a variety of attractive configurations and was susceptible to any of a variety of outer finishes including metal plating and painting.

A significant problem with respect to plastic wheel trim was obtaining satisfactory retention to the wheel. A variety of systems have been proposed for retaining plastic wheel trim with varying degrees of success.

Wheel trim have been secured to the outer wheel weight rim of a wheel, however, metal barbs were required which had a tendency to scratch the wheel and induce wheel corrosion.

It has been found that plastic wheel trim retention systems which engage a wheel lug nut have proven most effective. In U.S. Pat. No. 4,998,780, issued to Martin E. Russell, et al., disclosed a wheel trim retention comprised a series of plastic caps which were captured in apertures extending through the wheel trim. The caps included internal threads which engaged specially configured wheel lug nuts having mating external threads.

While the retention system disclosed in U.S. Pat. No. 4,998,780 proved to be effective in securely retaining the wheel trim, vehicle owners found that the removal and mounting of the wheel trim to a vehicle wheel was not a simple task, since a lug nut wrench was required to rotate the caps. Further, specially configured lug nuts were required.

Snap on retention systems were preferred because of their simplicity in mounting and dismounting the wheel trim, however, the engagement between a plastic retention and a lug nut suffered significant problems because wheel heat, generated by the vehicle breaking system, resulted in elevated temperatures not only of the wheel disk, rotor or brake drum, but additionally, the lugs and the lug nuts. The plastic retainers which were in contact with the lug nuts were thus subject to elevated temperatures, which resulted in degraded retentivity and the loss of the wheel trim on a highway, freeway or other roadway and concomitant hazards to motorists attempting to avoid the road debris.

While attempts have been made to employ metal socket clips to grip lug nuts, as exemplified in U.S. Pat. No. 4,133,583 and U.S. Pat. No. 5,297,854, such approach resulted in increased manufacturing costs. Further, difficulty was often encountered in mounting the wheel trim to the wheel because the metal clips did not provide sufficient guidance for centering the wheel trim on the wheel, with the wheel trim having a tendency to float. Further, unless costly alloys were employed, the clips were subject to corrosion from water and road salts which was accelerated by the elevated temperatures of the lug nuts.

SUMMARY OF THE INVENTION

A lug nut engaging retention for plastic wheel trim includes a plurality of tubular sockets which project axially from the inner face of the wheel trim. Each socket comprises three concentric arcuate lug nut engaging panels, equilaterally spaced from the center of the socket. Two of the panels include lips that snap over a peripheral flange of a lug nut, while the third panel is registered with a radial plane extending from the center of the wheel trim and serves as a centering guide.

A circumscribing metal ring engages the periphery of the panels adjacent their apical ends to reinforce the radially inwardly directed bias of the lipped panels in the presence of elevated temperatures.

The socket also includes three legs which are spaced about the socket center at a radius greater than that of the panels and which are positioned between the panels. Each leg includes a pair of spaced abutments which will engage the ring to limit axial movement of the ring relative to the panels.

From the foregoing compendium, it will be appreciated that it is an aspect of the present invention to provide a retention system for plastic wheel trim which is not subject to the disadvantages of the antecedents of the invention.

A feature of the present invention is to provide a retention system for plastic wheel trim which maintains high retentivity in the presence of elevated temperatures.

A consideration of the present invention is to provide a retention system for plastic wheel trim of the general character described which is relatively low in cost.

Another aspect of the present invention is to provide a retention system for plastic wheel trim of the general character described which avoids metal-to-metal contact.

A still further feature of the present invention is to provide a retention system for plastic wheel trim of the general character described which may be unitarily molded in one piece with the wheel trim.

An additional consideration of the present invention is to provide a retention system for plastic wheel trim of the general character described which is well adapted for economical mass production fabrication.

A further aspect of the present invention is to provide a retention system for plastic wheel trim of the general character described which is easy to assemble.

Another feature of the present invention is to provide a retention system for plastic wheel trim which is sturdy and durable.

A still further consideration of the present invention is to provide a retention system for plastic wheel trim of the general character described which facilitates simple mounting and removal of the wheel trim.

Yet another feature of the present invention is to provide a retention system for plastic wheel trim of the general character described which is well suited for implementation with any thermoplastic molded wheel trim.

A still further aspect of the present invention is to provide a retention system for plastic wheel trim of the general character described which assures that the wheel trim will self center about the locus of wheel lug nuts.

Other aspects, features and considerations of the present invention in part will be obvious and in part will be pointed out hereinafter.

With these ends in view, the invention finds embodiment in the certain combinations of elements, arrangements of parts and series of steps by which the aforesaid aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings, in which is shown one of the various possible exemplary embodiments of the invention, FIG. 2 is a perspective view of a socket, with portions of wheel trim deleted for clarity, FIG. 3 is a top plan view of the socket showing three arcuate panels for engaging a lug nut with a metal ring circumscribing the panels and also illustrating three legs having abutments for engaging the ring, FIG. 4 is a sectional view through the socket, the same being taken substantially along the plane 4-4 of FIG. 2 and illustrating a lower abutment on each leg for blocking the ring against axial downward movement along the panels, FIG. 5 is a sectional view through the socket, the same being taken substantially along the plane 5-5 of FIG. 2 and showing the panels and legs unitarily extending from the inner face of the wheel trim.

DESCRIPTION OF THE PREFERRED EMBODIMENT

Figure 1:
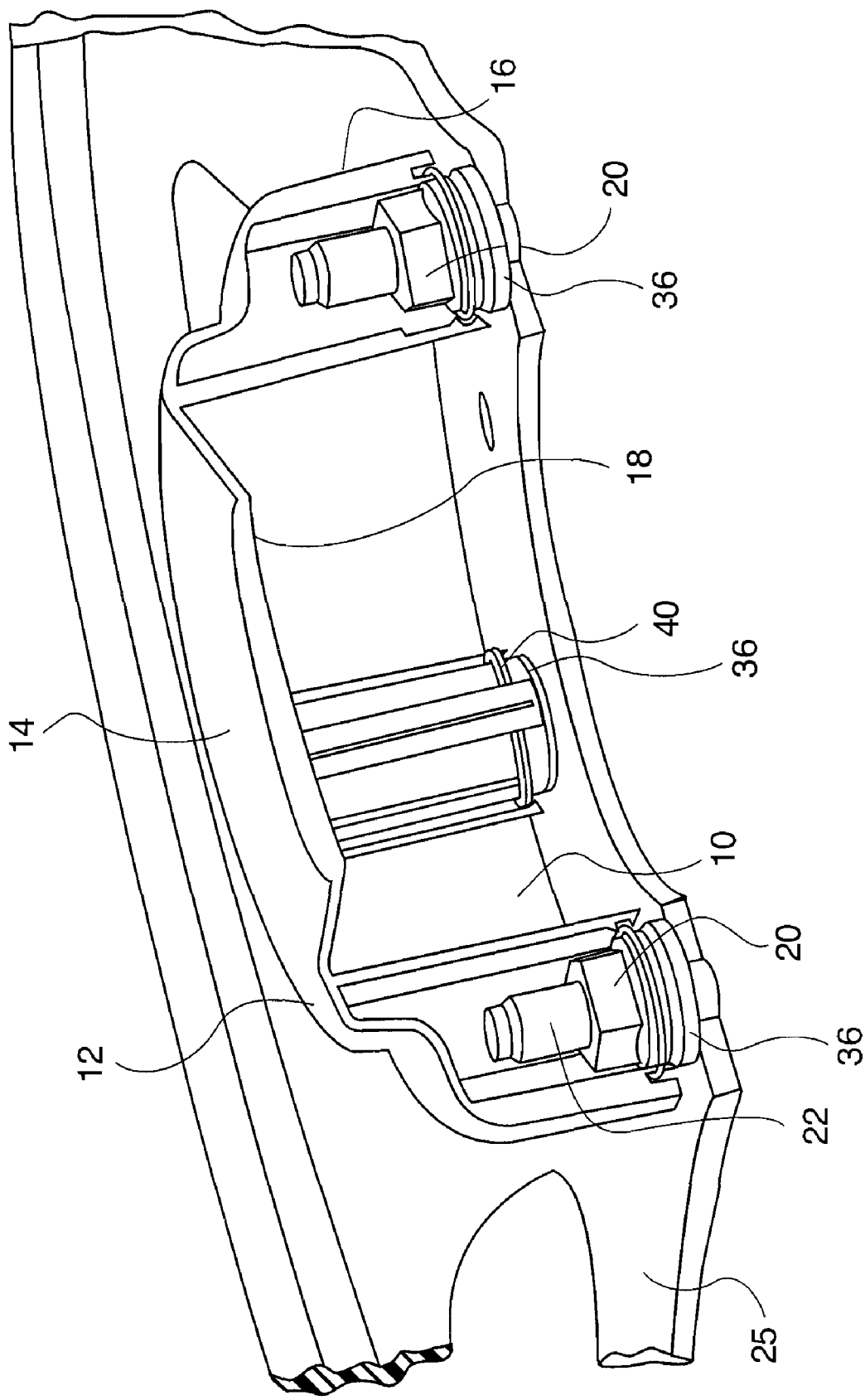
FIG. 1 is a perspective view of wheel trim comprising a plastic center cap having a retention system constructed in accordance with and embodying the invention and secured to lug nuts of a wheel, with the wheel trim being partially broken away to better illustrate tubular sockets engaging the lug nuts.
Figure 6:
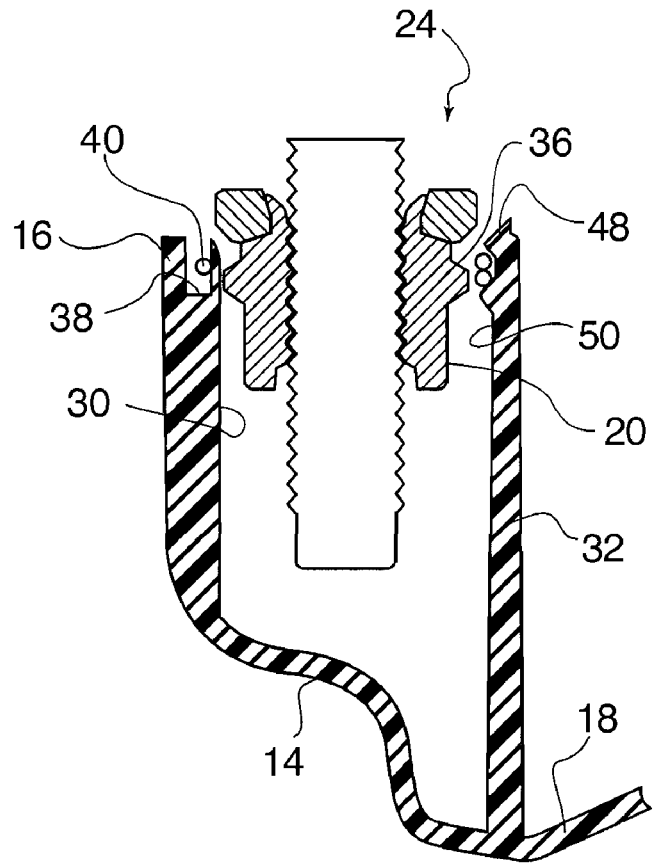
FIG. 6 is a sectional view through the socket, the same being taken substantially along the plane 6-6 of FIG. 3, which is a radial plane through the wheel trim, and illustrating a lug nut captured in the socket.
Figure 7:
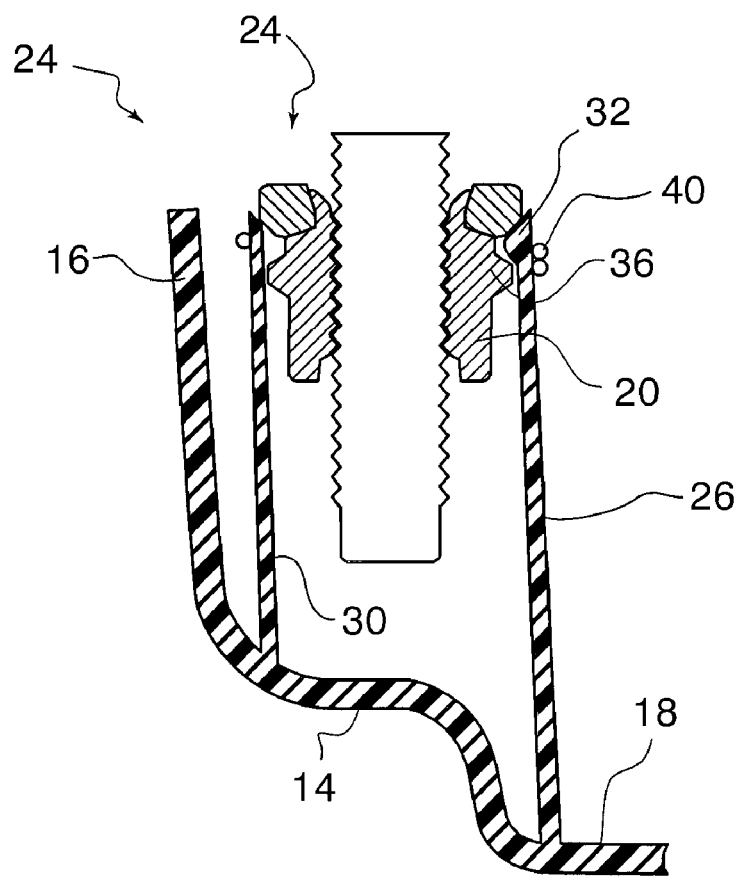
FIG. 7 is a sectional view through the socket, the same being taken substantially along the plane 7-7 and showing a lip formed at the apical end of an arcuate panel with the lip being engaged over a peripheral flange of the lug nut to retain the wheel trim in position.

With reference now in detail to the drawings, the reference numeral 10 denotes a retention system for plastic wheel trim constructed in accordance with and embodying the invention. The retention system 10 is unitarily formed with an item of molded plastic wheel trim 12, such as a center cap having an outer face 14, a peripheral skirt 16 and an inner face 18.

The retention system 10 is configured to capture wheel lug nuts 20 which are illustrated, by way of example only, as comprising two-piece lug nuts. It should be understood, however, that the present invention is equally suited for any type lug nut having a peripheral flange, such as a one-piece flange nut and a tapered nut. The lug nuts 20 are engaged over threaded lugs 22 which extend from a wheel hub through registered apertures in a wheel 25.

With reference now to FIG. 2 and FIG. 3, it should be noted that the retention system comprises a plurality of tubular sockets 24 molded in one piece with the wheel trim 12. Each of the tubular sockets 24 comprises three concentric arcuate lug nut engaging panels 26, 28, 30, which are equilaterally positioned about a center 15 of the socket 24.

The panels 26, 28 each include a lip 32, 34 which projects from its respective apical end toward the center 15 of the socket 24 and which is configured to snap over a peripheral flange 36 of the lug nut 20. A reinforcing rib 29 extends axially along the rear face of the panels 26, 28.

The panel 30 does not include a lip at its apical end and is joined to the peripheral skirt 16 by a radial web 38, as illustrated in FIG. 3. The panel 30 serves as a centering guide to assure that the wheel trim 12 stays centered on the wheel 25. As such, it is fixed against deflection relative to the wheel trim 12 by the web 38. The radial web 38 is registered with a radial plane of the wheel trim 12 illustrated in FIG. 3. In the event the wheel trim 12 comprises a full wheel cover, rather than a center cap, a suitable reinforcing flange is provided to assure that the panel 30 remains fixed relative to the wheel trim.

It should also be noted that a metal reinforcing ring 40 circumscribes the panels 26, 28 and 30 adjacent the apical end of each panels so that the radial retentive forces exerted at the lips, 32, 34 to maintain the wheel trim 12 in position do not suffer degradation when the temperature of the lug nut 20 rises. As illustrated in FIG. 3, the ring 40 is in abutting contact with the radially outer surface of each panel, 26, 28 and 30.

Each tubular socket 24 also includes three legs 42, 44, 46 which are spaced about the center 15 at a radius greater than that of the panels 26, 28, 30 and which are positioned between gaps formed between the panels. The apical end of each leg 42, 44, 46 includes a radially inwardly projecting abutment 48 which engages the ring 40 to prevent axial movement of the ring beyond the apical end of the socket 24 and a further radially inwardly projecting abutment 50, which precludes movement of the ring 40 toward the base of the socket 24.

It should be understood that a tubular socket 24 may not be required for each lug nut securing a vehicle wheel. For example, it is possible that a vehicle wheel secured with five or six lug nuts may only require wheel trim equipped with two or three sockets. Further, depending upon the specific vehicle application as well as the configuration of the wheel trim, not all of the sockets 24 may require a metal ring 40. For example, with a wheel trim 12 having a retention system 10 including four tubular sockets 24, the wheel trim 12 could possibly be held securely in place with only one or two of the sockets having metal rings.

It should also be appreciated that the tubular sockets 24 may be comprised of more than three arcuate panels, for engaging the lug nuts and/or legs, for restraining axial movement of the metal ring 40. Further, the sockets 24 need not be closed at their wheel trim ends, so that the lug nuts 20 will be visible from the outer face 14.

Thus it will be seen that there is provided a retention system for plastic wheel trim which achieves the various aspects, features and considerations of the present invention and which is well adapted to meet the conditions of practical usage.

As various possible further embodiments might be made of the present invention and as various changes might be made in the illustrative embodiment set forth herein without departing from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A wheel trim retention system for engaging flanged lug nuts securing a vehicle wheel, the system comprising at least one socket extending axially from an inner face, of the wheel trim, the socket being dimensioned to receive a lug nut, the socket having a center, the socket comprising a plurality of panels equidistantly radially spaced from the center, a lip formed on at least two panels, the lip extending radially toward the center, a reinforcing ring circumscribing the panels and a plurality of legs equidistantly radially spaced from the center, the legs being spaced from the center a radial distance greater than that of the panels, the legs including abutments for limiting axial movement of the reinforcing ring.

2. A wheel trim retention system as constructed in accordance with claim 1 wherein the socket includes at least three panels, the lip being formed on less than all of the panels, at least one of the panels not including a lip and adapted to center the wheel trim, the at least one panel being fixed against movement relative to the wheel trim.

3. A wheel trim retention system as constructed in accordance with claim 2 wherein the wheel trim includes a peripheral skirt, the at least one panel being unitarily joined to the peripheral skirt.

4. A wheel trim retention system as constructed in accordance with claim 3 further including a web joining the at least one panel to the peripheral skirt.

5. A wheel trim retention system as constructed in accordance with claim 4 wherein the web extends through a radial plane of the wheel trim.

6. A wheel trim retention system as constructed in accordance with claim 1 further including a plurality of identical sockets.

7. A wheel trim retention system as constructed in accordance with claim 1 wherein the lip is positioned at an apical end of the at least two panels.

8. A wheel trim retention system as constructed in accordance with claim 1 wherein the panels are spaced apart, the legs being positioned between the spaced apart panels.

9. A wheel trim retention system as constructed in accordance with claim 1 wherein the socket comprises three equilaterally spaced panels.

10. A wheel trim retention system as constructed in accordance with claim 1 wherein each leg includes a pair of axially spaced abutments.

11. A plastic wheel trim comprising an outer face, an inner face and a peripheral lip, the wheel trim including a wheel trim retention system, the retention system comprising a plurality of sockets extending axially from the inner face, each socket being adapted to receive a lug nut securing a wheel to a hub, the lug nut having a peripheral flange, each socket having a center and a plurality of arcuate panels equidistantly radially spaced from the center, a lip formed at an apical end of at least two of the arcuate panels of the plurality of arcuate panels, the lips extending radially inwardly toward the center, the lips engaging the lug nut between the peripheral flange and the wheel and retaining the lug nut within the socket, one of the arcuate panels of the plurality of panels not including a lip, the one panel being fixed against movement relative to the wheel trim, each socket further including a reinforcing ring circumscribing the arcuate panels and abutting the radially outer surface of each panel.

12. A plastic wheel trim as constructed in accordance with claim 11 wherein the wheel trim includes a peripheral skirt, the one panel being unitarily joined to the peripheral skirt.

13. A plastic wheel trim as constructed in accordance with claim 12 further including a web joining the one panel to the peripheral skirt.

14. A method of securing a plastic wheel trim to a vehicle wheel, the wheel being secured to a hub by a plurality of lug nuts having peripheral flanges, the method comprising the steps:
  a) molding a wheel trim having a plurality of sockets extending axially from an inner face of the wheel trim, each socket including a plurality of arcuate panels with at least two panels having radially inwardly extending lips and one panel being free of a lip,
  b) abutting the radially outer surface of each of the arcuate panels with a reinforcing ring positioned adjacent apical ends of the arcuate panels,
  c) restraining the ring in its axial position abutting the panels by providing a plurality of legs, each leg having a limit stop for engaging the reinforcing ring,
  d) registering the sockets with the lug nuts,
  e) axially moving the wheel trim such that the sockets engage the lug nuts,
  f) flexing the arcuate panels having lips to outwardly spread the lips and permit the lug nut flanges to enter the socket, and
  g) snapping the lips against the lug nuts after the lug nut flanges have passed into the socket beyond the lips.

15. A method of securing a plastic wheel trim to a vehicle wheel in accordance with claim 14 further including the step of centering the wheel trim by restraining the one panel against movement relative to the wheel trim.

16. A method of securing a plastic wheel trim to a vehicle wheel in accordance with claim 15 wherein the step of centering the wheel trim includes positioning the one panel on a radial plane of the wheel trim.

17. A method of securing a plastic wheel trim in accordance with claim 16 wherein the one panel is restrained against movement relative to the wheel trim by joining the one panel to a peripheral skirt of the wheel trim with a web.

18. A plastic wheel trim as constructed in accordance with claim 11, the one panel lying in a radial plane of the wheel trim.

19. A plastic wheel trim as constructed in accordance with claim 11 wherein each socket includes three arcuate panels, the three panels being equilaterally arrayed.

20. A plastic wheel trim as constructed in accordance with claim 13 wherein the web extends through a radial plane of the wheel trim.

* * * * *